US012573250B2

(12) United States Patent
Park

(10) Patent No.: US 12,573,250 B2
(45) Date of Patent: Mar. 10, 2026

(54) USED CAR AI PERFORMANCE INSPECTION SYSTEM BASED ON ACOUSTIC DATA ANALYSIS, AND PROCESSING METHOD THEREFOR

(71) Applicant: OCMOBILE CO., LTD., Seoul (KR)

(72) Inventor: Jun Young Park, Seoul (KR)

(73) Assignees: OCMOBILE CO., LTD., Seoul (KR); Jun Young Park, Seoul (KR)

( * ) Notice: Subject to any disclaimer, the term of this patent is extended or adjusted under 35 U.S.C. 154(b) by 118 days.

(21) Appl. No.: 18/835,016

(22) PCT Filed: Nov. 30, 2022

(86) PCT No.: PCT/KR2022/019133
§ 371 (c)(1),
(2) Date: Aug. 1, 2024

(87) PCT Pub. No.: WO2023/149634
PCT Pub. Date: Aug. 10, 2023

(65) Prior Publication Data

US 2025/0140035 A1 May 1, 2025

(30) Foreign Application Priority Data

Feb. 7, 2022 (KR) ........................ 10-2022-0015851
Feb. 9, 2022 (KR) ........................ 10-2022-0017220

(51) Int. Cl.
*G07C 5/08* (2006.01)

(52) U.S. Cl.
CPC ......... *G07C 5/0808* (2013.01); *G07C 5/0816* (2013.01)

(58) Field of Classification Search
None
See application file for complete search history.

(56) References Cited

U.S. PATENT DOCUMENTS

| | | | | |
|---|---|---|---|---|
| 11,847,872 B1 * | 12/2023 | Post | ........................ | G01M 7/00 |
| 2024/0253655 A1 * | 8/2024 | Safavi | ................ | G01M 17/013 |

FOREIGN PATENT DOCUMENTS

| | | | | | |
|---|---|---|---|---|---|
| JP | 2004362347 | A | | 12/2004 | |
| KR | 20150058928 | A | | 5/2015 | |
| KR | 20190023059 | A | | 3/2019 | |
| KR | 101970641 | B1 | | 4/2019 | |
| KR | 20190140363 | A | | 12/2019 | |
| KR | 20210041437 | A | * | 4/2021 | ........... G07C 5/0808 |
| KR | 102305809 | B1 | | 9/2021 | |
| KR | 102459471 | B1 | | 10/2022 | |

OTHER PUBLICATIONS

International Search Report mailed Mar. 7, 2023 for PCT/KR2022/019133.

* cited by examiner

*Primary Examiner* — Abdhesh K Jha
(74) *Attorney, Agent, or Firm* — CANTOR COLBURN LLP

(57) ABSTRACT

Disclosed is a used car AI performance inspection method performing a visualization processing procedure that generates visualization processed graphics from results of computer analysis of unstructured data and displays them on an AI performance checklist, and a segmentation analysis processing procedure that divides an acoustic data into frequency bands according to predetermined standards, and scores for a state of each frequency band, and displays them on the AI performance checklist.

5 Claims, 13 Drawing Sheets

FIG. 5

| Storing a used car in warehouse #1 | | Sound information pre-processing | car model (detailed) information inquiry |
|---|---|---|---|
| collected license plate number of a used car | 12GA0001 | Fourier transformation noise removal | (1) license plate number to be queried => 12GA0001<br>(2) inquired car model Information => vehicle identification number=KN12345678A123456; brand=Hyundai; model=Grandeur IG; Trim=3.0 gasoline; detailed trim=Exclusive Special; transmission=auto; drive=front wheel; Model=2017 model year; Production=February 2019; model name=HG4EBK-G; ride capacity=5; prime mover type=G6DG; Displacement=2999; body length=4920; body width=1860; Airbag=Advanced; Option=Around view; Tire=19 inch; Sunroof=Y; ... |
| collected acoustic signal | 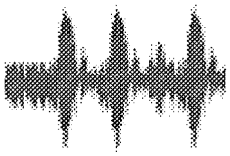 | | |
| ... | ... | ... | ... |

FIG. 6

| acoustic information event extraction | | | | |
|---|---|---|---|---|
| Comparison with existing collected information (DB) | | Result | inquery error DB for each car model | Extraction of anomaly information |
| existing collected information | 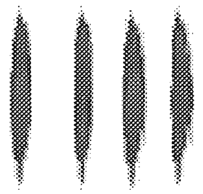 | anomalies detection | (1) car model to inquire Brand = Hyundai; Model = Grandeur IG; transmission = Auto; Drive = front wheel; Model = 2017 model year; Production = February 2019<br><br>(2) Search result 12 defective front right lower arm bushings were found. | 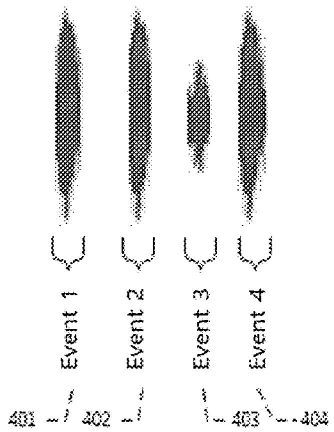 |
| Information currently generated | 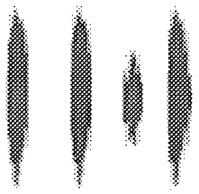 | | | |
| | ... | | | ... |

FIG. 7

| Error diagnosis and DB prediction | Combination with car model information | Storing a used car in warehouse or vehicle leaves | |
|---|---|---|---|
| (1) Engine failure - No. 3 injector failure<br>(2) Defective front right lower arm bushing | (1) license plate number to be queried => 12GA0001<br>(2) inquired car model Information => vehicle identification number=KN12345678A123456; brand=Hyundai; model=Grandeur IG; Trim=3.0 gasoline; detailed trim=Exclusive Special; transmission=auto; drive=front wheel; Model=2017 model year; Production=February 2019; model name=HG4EBK-G; ride capacity=5; prime mover type=G6DG; Displacement=2999; body length=4920; body width=1860; Airbag=Advanced; Option=Around view; Tire=19 inch; Sunroof=Y; ...<br>(3) failure information : Engine failure - No. 3 injector failure<br>(4) Preventive maintenance required: Defective front right lower arm bushing | license plate number of a used car | 12GA0001 |
| | | content of information display device | (1) Failure information: engine failure - No. 3 injector failure<br><br>(2) Preventive maintenance required: Defective front right lower arm bushing<br><br>(3) Recommended repair shop: Ganada repair shop, 300m, lowest price |
| | ... | ... | ... |

FIG. 13

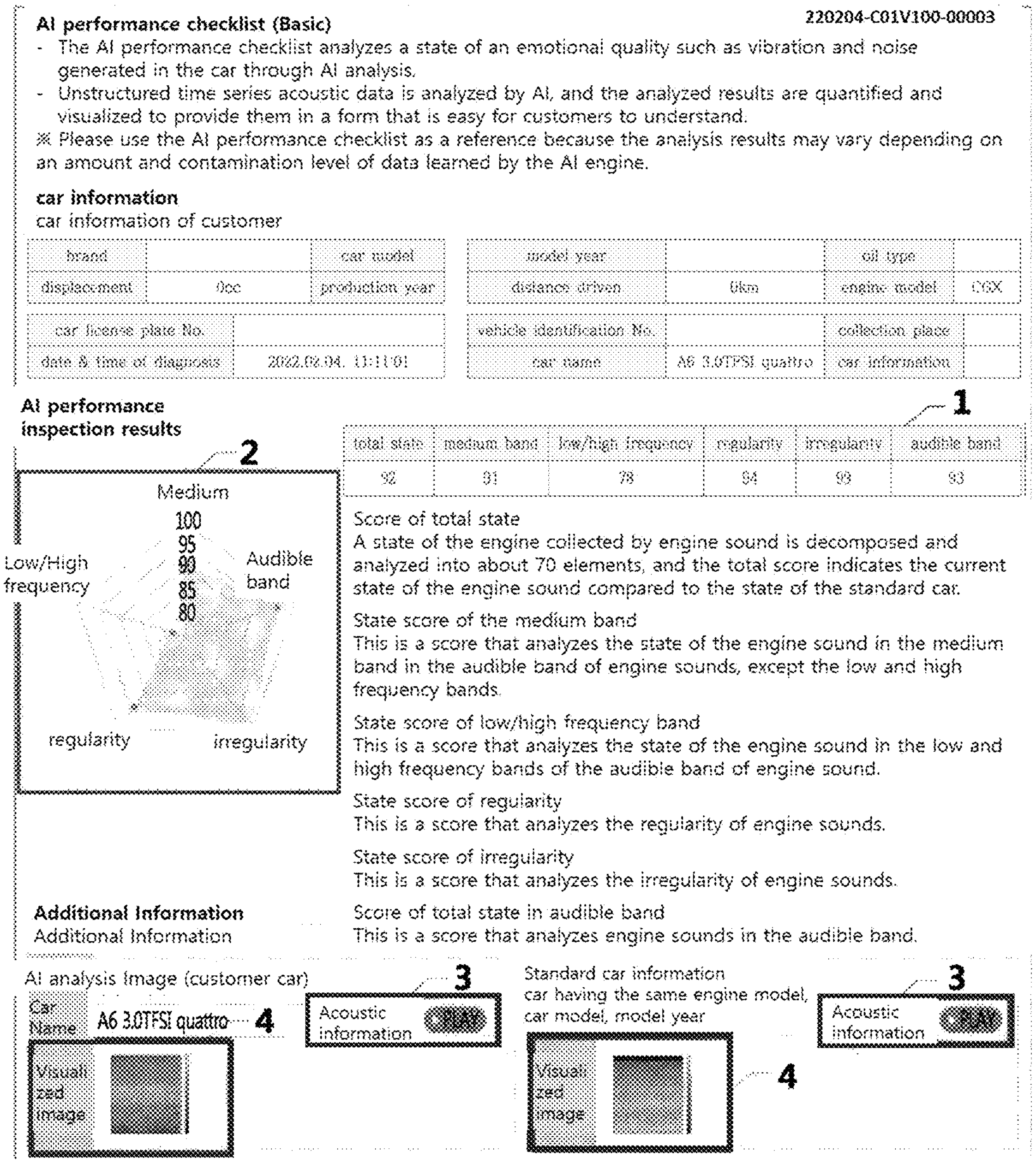

AI performance checklist (Basic) 220204-C01V100-00003

- The AI performance checklist analyzes a state of an emotional quality such as vibration and noise generated in the car through AI analysis.
- Unstructured time series acoustic data is analyzed by AI, and the analyzed results are quantified and visualized to provide them in a form that is easy for customers to understand.

※ Please use the AI performance checklist as a reference because the analysis results may vary depending on an amount and contamination level of data learned by the AI engine.

car information
car information of customer

| brand | | car model | model year | | oil type | |
|---|---|---|---|---|---|---|
| displacement | 0cc | production year | distance driven | 0km | engine model | CGX |

| car license plate No. | | vehicle identification No. | | collection place | |
|---|---|---|---|---|---|
| date & time of diagnosis | 2022.02.04. 11:11:01 | car name | A6 3.0TFSI quattro | car information | |

AI performance inspection results

1

| total state | medium band | low/high frequency | regularity | irregularity | audible band |
|---|---|---|---|---|---|
| 92 | 91 | 78 | 94 | 93 | 93 |

Score of total state
A state of the engine collected by engine sound is decomposed and analyzed into about 70 elements, and the total score indicates the current state of the engine sound compared to the state of the standard car.

State score of the medium band
This is a score that analyzes the state of the engine sound in the medium band in the audible band of engine sounds, except the low and high frequency bands.

State score of low/high frequency band
This is a score that analyzes the state of the engine sound in the low and high frequency bands of the audible band of engine sound.

State score of regularity
This is a score that analyzes the regularity of engine sounds.

State score of irregularity
This is a score that analyzes the irregularity of engine sounds.

Additional Information
Additional Information

Score of total state in audible band
This is a score that analyzes engine sounds in the audible band.

AI analysis Image (customer car)
Car Name A6 3.0TFSI quattro 4
Acoustic information PLAY 3
Visualized image Standard car information
car having the same engine model, car model, model year
Acoustic information PLAY 3
Visualized image 4

USED CAR AI PERFORMANCE INSPECTION SYSTEM BASED ON ACOUSTIC DATA ANALYSIS, AND PROCESSING METHOD THEREFOR

TECHNICAL FIELD

The present application claims priorities based on Korean Patent Application No. 10-2022-0015851 filed on Feb. 7, 2022 and Korean Patent Application No. 10-2022-0017220 filed on Feb. 9, 2022, and all contents disclosed in the specifications and drawings of these applications are included in the present application.

The present invention relates to an AI performance inspection system based on acoustic data analysis and processing method therefor, and more particularly, to a system and a method based on acoustic data analysis that generates emotional quality indicators for noise, vibration, etc. generated in car and provides analysis results and supporting data online.

BACKGROUND ART

In general, in a used car transaction, people who want to buy a used car visit a large local used car market and select the used car by being introduced or by visiting and looking at the used car for sale. But even in these cases, most of them decide whether or not to buy the used car by car registration book, insurance accident history, and performance inspection table of the car. And if they know some about cars, they start the engine themselves, and the reality is that there are very few cases of actual test driving unless it is an expensive car or something.

In recent years, online transactions have been activated, but unsatisfactory transactions frequently occur online because a quality of used cars must be judged based on only a small amount of information. In particular, since information about the used car's driving condition or engine condition etc. is very insufficient, it is common for unfair transactions to take place under situations of extreme information asymmetry. If the purchased car caused problems, the buyers think they have been cheated due to the asymmetry of information, which leads to a climate of distrust for a used car trading industry as a whole.

Regarding the method of performance inspection and its certificate, which are essential for trading used cars, currently, professional inspectors rely on their experience to inspect parts for repair, replacement, and leakage of various parts and issue a certificate, but the reality is that even after the actual user of the used car purchases the used car, they do not properly understand an emotional quality that occurs when the used car's engine is running or while the used car is driving. In recent years, as online transactions and non-face-to-face transactions have become increasingly active, such asymmetric transactions are becoming more severe.

Alternatively, Patent Registration No. KR 10-1970641 provides more reliable used car market price information by calculating a performance inspection cost expected in the future and calculating the used car market price by reflecting a performance inspection guarantee insurance for the expected performance inspection cost, and a used car trading system that reflects the performance inspection guarantee insurance, which can reduce a burden of used car performance inspection costs for used car customers through performance inspection guarantee insurance.

However, the used car industry still needs auxiliary means to expand customers' options, and they do not mean an information delivered by paper only, but require direct or indirect experience of a sound of driving car or a sound generated by the engine. In this way, an intelligent performance inspection service suitable for the era of the 4th industry is required.

As another alternative, Registered Patent Publication KR 10-2305809 B1, for which the present applicant has previously applied and been granted a patent, disclosed a used car AI performance inspection system in which unstructured data such as acoustic informations generated from the used cars are collected and analyzed to analyze a normal or abnormal state of the car and the results of the performance inspection are visualized to be provided to customers.

The existing intelligent performance inspection service system has an advantage of being able to intuitively check if there are any abnormalities in automobile parts such as engine through the final result graph, but it does not determine specifically which characteristics are problematic and which characteristics are normal. There are limitations in delivering detailed information to customers, so improvements are required.

DISCLOSURE

Technical Goal

The present invention was created in consideration of the above problems, and the purpose of the present invention is to provide a used car AI performance inspection system and processing method based on acoustic data analysis to provide indicators of emotional quality by classifying acoustic data generated from the car's driving or engine in detail according to criteria such as frequency band and analyze it more precisely and accurately through AI learning.

Technical Solution

In order to achieve the above goals, the present invention includes steps of; (a) a performance checklist generation module inquires detailed car model information of the used car; (b) the performance checklist generation module collects unstructured data including sounds generated from mechanical or electronic devices of the used car using an acoustic sensor; (c) the performance checklist generation module performs an AI performance inspection by diagnosing the collected unstructured data through a computer analysis and generating an AI performance checklist by reflecting results of the AI performance inspection; and (d) an unstructured data transmission unit provides the AI performance checklist generated by the performance checklist generation module to a customer.

The step (c) includes steps of; a visualization processing procedure that generates visualization processed graphics from the results of computer analysis of the unstructured data and displays the graphics on the AI performance checklist; performing a segmentation analysis processing procedure that divides the acoustic data into frequency bands according to predetermined standards, and scores for a state of each frequency band, and displays the state on the AI performance checklist.

The segmentation analysis processing procedure of the step (c) subdivides the acoustic data into low-frequency band, mid-range band, high-frequency band, regularity and irregularity regions, scores the states of each band or region, and displays the scores on the AI performance checklist.

In the segmentation analysis processing procedure of the step (c), the state of each region or band is visualized as a polygonal graph by the score and the total score on the AI performance checklist.

In the segmentation analysis processing procedure of the step (c), each region or band is decomposed into a plurality of characteristic elements, analyzed, and scored.

In the step (c), a user interface with a function of streaming and playing acoustic information collected for specific parts of the used car and pre-stored standard car acoustic information for each car model is displayed on the AI performance checklist.

In the step (c), the visualization processed graphics are spectrograms that show changes in time, frequency, and amplitude of the acoustic signal in terms of concentration or color difference. The spectrograms for each of a normal performance state and a deteriorated performance state of the used car are generated and displayed on the AI performance checklist.

According to another aspect of the present invention, a used car AI performance inspection system based on acoustic data analysis is provided.

The system comprises; a performance checklist generation module that searches car model details, collects unstructured data including sounds generated from mechanical or electronic devices of the used car using an acoustic sensor, diagnoses the collected unstructured data through computer analysis to perform an AI performance inspection, and generates an AI performance checklist by reflecting the AI performance inspection results; and an unstructured data transmission unit providing the AI performance checklist generated by the performance checklist generation module to a customer.

The performance checklist generation module comprises a car model information inquiry unit that searches the car model information; an acoustic signal acquisition unit that collects acoustic signals generated from mechanical or electronic devices of the used car; an acoustic information pre-processing unit that digitizes the collected acoustic signals to generate acoustic data; a car model information DB that stores an acoustic data of a standard car; a car model information mapping unit that maps the acoustic data with the car model information DB to detect abnormal signs of the car; an acoustic data analyzer that analyzes the acoustic data to score characteristics and states of the car; and a performance information report processing unit that generates an abnormality report when an abnormality is found in the acoustic data and generates a normal report when there is no abnormality and reflects them in the AI performance inspection results.

The system performs a visualization processing procedure that generates visualization processed graphics from the results of computer analysis of the acoustic data and displays them on the AI performance checklist, and a segmentation analysis processing procedure that divides the acoustic signal into frequency bands according to predetermined standards, and scores for a state of each frequency band, and displays the scores on the AI performance checklist.

The visualization processed graphics are spectrograms that show changes in time, frequency, and amplitude of the acoustic signal in terms of concentration or color difference, and the spectrograms for each of a normal performance state and a deteriorated performance state of the used car are generated and displayed on the AI performance checklist.

Advantageous Effects

The used car AI performance inspection system based on acoustic data analysis, and processing method therefor according to the present invention have the following effects.

First, car parts are organically connected to each other and move in different cycles. The prior arts for used car performance inspection based on acoustic data analysis record the sound of each part and check whether the sound is heard. However, due to a nature of mechanical parts, the same results cannot be obtained because of errors during production and wear, therefore these approaches cannot accurately diagnose a state of the car. Compared to this, the present invention does not find the natural frequency of individual parts, but separates them by specific frequency bands, analyzes periodic and aperiodic patterns within them, learns them, and uses them for diagnosis, thereby achieving detailed performance inspection and reliability of inspection data.

Second, by accumulating error detection data by car model information, similar failure and maintenance factors caused by similar parts can be identified in advance, and detailed maintenance information can be provided to accumulate detailed failure and maintenance history for the car.

Third, by visualizing the AI performance inspection results, the normal performance state and the deteriorated performance state are compared using visualization processed graphics such as a spectrogram and displayed on the customer terminal, allowing the customer to intuitively understand the normal/abnormal state of the car.

DESCRIPTION OF DRAWINGS

FIGS. 5 to 7 are tables illustrating acoustic information and car model information processed by the used car AI performance inspection system based on acoustic data analysis according to a preferred embodiment of the present invention.

FIG. 13 is a computer screen capture illustrating an AI performance checklist generated according to the present invention.

BEST MODE

Hereinafter, preferred embodiments of the present invention will be described in detail with reference to the attached drawings.

Figure 1:
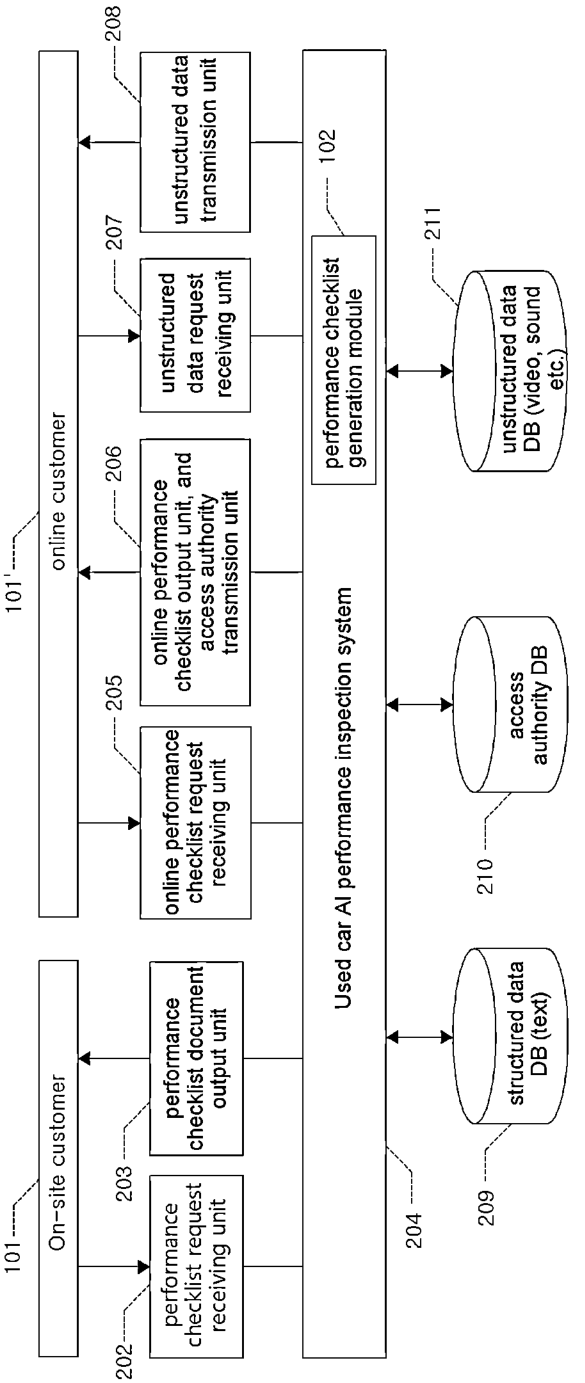
FIG. 1 is a block diagram showing a configuration of a used car AI performance inspection system based on acoustic data analysis according to a preferred embodiment of the present invention.

FIG. 1 is a block diagram showing configurations of a used car AI performance inspection system according to a preferred embodiment of the present invention.

Referring to FIG. 1, the used car AI performance inspection system 204 according to a preferred embodiment of the present invention includes an online performance checklist request receiving unit 205, an online performance checklist output unit and access rights transmission unit 206, and an unstructured data request receiving unit 207, an unstructured data transmission unit 208, and a performance checklist generation module 102. In addition, for on-site visiting customers (car buyers) 101, the used car AI performance inspection system 204 includes a performance checklist request receiving unit 202 and a performance checklist document output unit 203.

The used car AI performance inspection system 204 is configured to include or be linked with a structured data DB 209 that stores text data that fits into an area of a common car performance checklist, an access rights DB 210 that stores data to provide performance inspection results only to approved users, and an unstructured data DB 211 that stores unstructured data generated from mechanical or electronic devices of the car being measured by interior/exterior photography, sound, images, and sensors.

The performance checklist generation module 102 searches detailed car model information of the used car, and collects unstructured data generated from the car's mechanical or electronic devices through interior/exterior photography, sound, video, and sensors of the used car.

For example, the performance checklist generation module 102 may search the detailed car model information through a car license plate number of the used car.

The performance checklist generation module 102 performs the AI performance inspection to check car performance by diagnosing the collected unstructured data through computer analysis.

Figure 2:
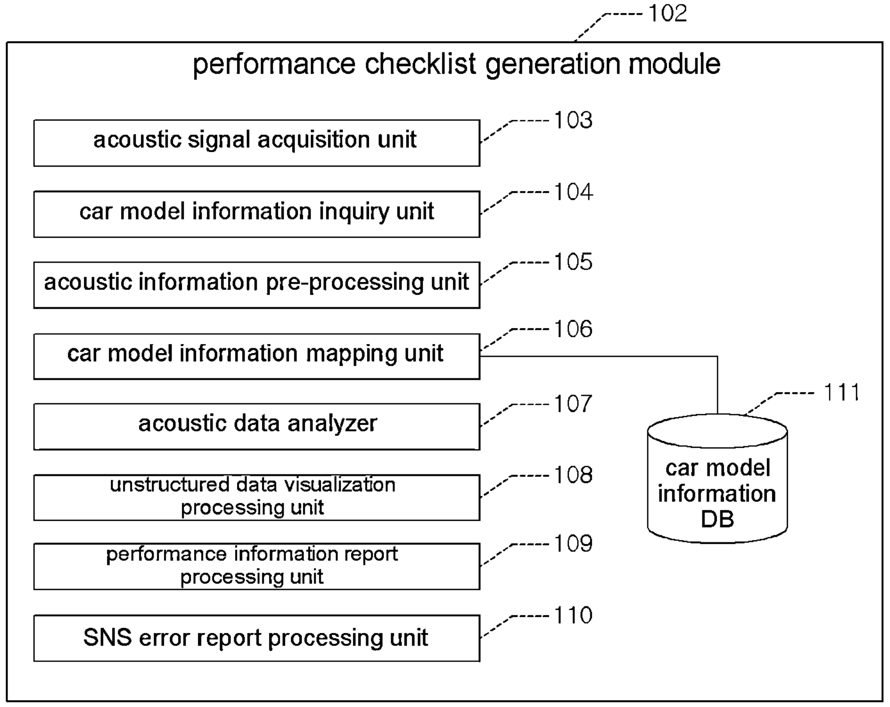
FIG. 2 is a block diagram showing a configuration of a performance checklist generation module in FIG. 1.

As shown in FIG. 2, the performance checklist generation module 102 includes an acoustic signal acquisition unit 103, a car model information inquiry unit 104, an acoustic information pre-processing unit 105, a car model information mapping unit 106, and acoustic data analyzer 107, an unstructured data visualization processing unit 108, a car model information DB 111, and a performance information report processing unit 109.

The acoustic signal acquisition unit 103 collects acoustic signals generated from mechanical and electronic devices of the car.

The collection of acoustic signals to identify abnormal signs in a car is performed by an acoustic sensor such as a microphone installed in a passenger seat, engine room, lower part of the car, or on the outside of the car. Since various mechanical mechanisms such as wheels and drivetrains are combined in a car, it is effective to place it in areas where various internal and external forces act. When installed outside a car, it can be installed at a bottom or side of an entrance to places where services are easily provided to cars such as parking lots, gas stations, car washes, maintenance shops, drive-in cafes, etc., including one side of a used car dealer's facility. In these places, acoustic sensors such as microphones that detect frequencies beyond an audible frequency (20 to 20,000 Hz) are advantageous to detect mechanical abnormalities. Acoustic sensors collect mechanical sounds when the car moves at a constant speed or is stationary. The acoustic signals collected in this way are analyzed through an analysis computer connected directly or via communication to find unusual frequency patterns.

Recognition of car plate number is performed by a camera installed at a service provider's gate facility. If a car license plate number is matched with the detailed car model information of an internal system or external system and the matching is stored in a database, it is possible to group and determine abnormal signs that are specific to the car that has entered and exited the gate according to the car model, thereby recognizing abnormal signs that are due to the car model characteristics or that are due to the specific car, and using the abnormal signs as a targeted data.

The car model information inquiry unit 104 obtains a license plate number of the car and retrieves the car model information. From the number recognized by a camera installed in a gate facility, the car model information of the car is obtained from the additional information provider or public information API.

That is to say, after reading the number for example, '12GA1234', the car model information inquiry unit 104 obtains a subdivided classification information such as 'vehicle identification number (VIN)=KN12345678A123456; Brand=Hyundai; Model=Grandeur IG; trim=3.0; Gasoline; Detailed Trim=Exclusive Special; transmission-auto; drive=front wheel; Model=2017 model year; Production=February 2019; Model Name=HG4EBK-G; Ride Capacity=5; Prime mover type=G6DG; Displacement=2999; body length=4920; body width=1860; airbag-advance; option=around view; Tires=19 inches; sunroof=Y'.

The acoustic information pre-processing unit 105 digitizes the collected acoustic signals to generate an acoustic information data. Specifically, the acoustic information pre-processing unit 105 generates the acoustic information data composed of frequency components generated from mechanical devices of the car by performing Fourier transform and a noise removal processing on the collected acoustic signals as shown in FIGS. 5 to 7.

The car model information mapping unit 106 maps the acoustic information data with the car model information DB that stores various error case informations for each car model to detect abnormal signs of the car.

Figure 4:
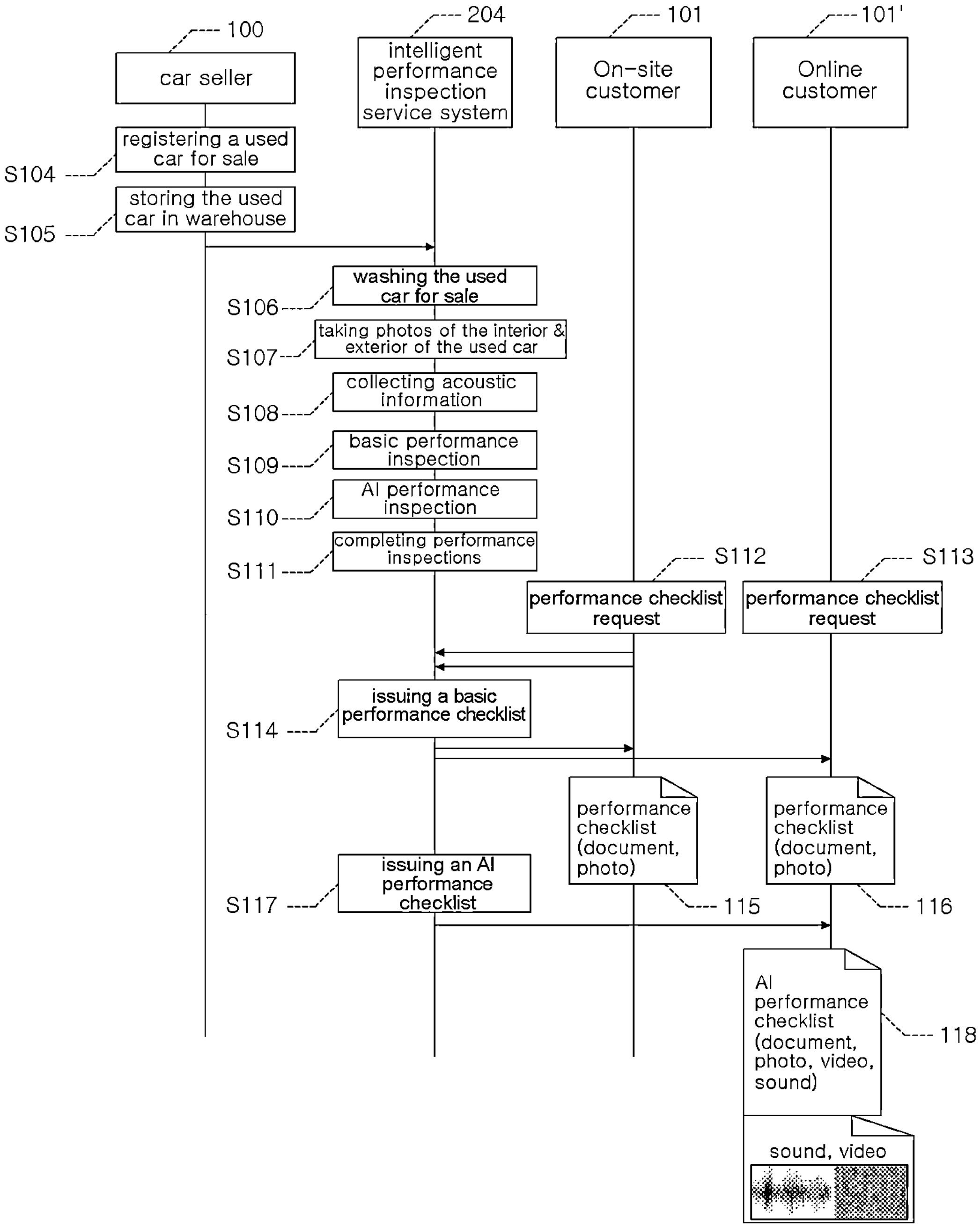
FIG. 4 is a procedure diagram showing a process of performing the used car AI performance inspection processing method based on acoustic data analysis according to a preferred embodiment of the present invention.

The acoustic data analyzer 107 analyzes a pattern of the acoustic information for the acoustic information data generated by the acoustic information pre-processing unit 105 to detect abnormal symptom events 401 to 404 of the car. In this regard, the pattern analysis process of the acoustic information is schematically illustrated in FIGS. 4 to 6.

Figure 3:
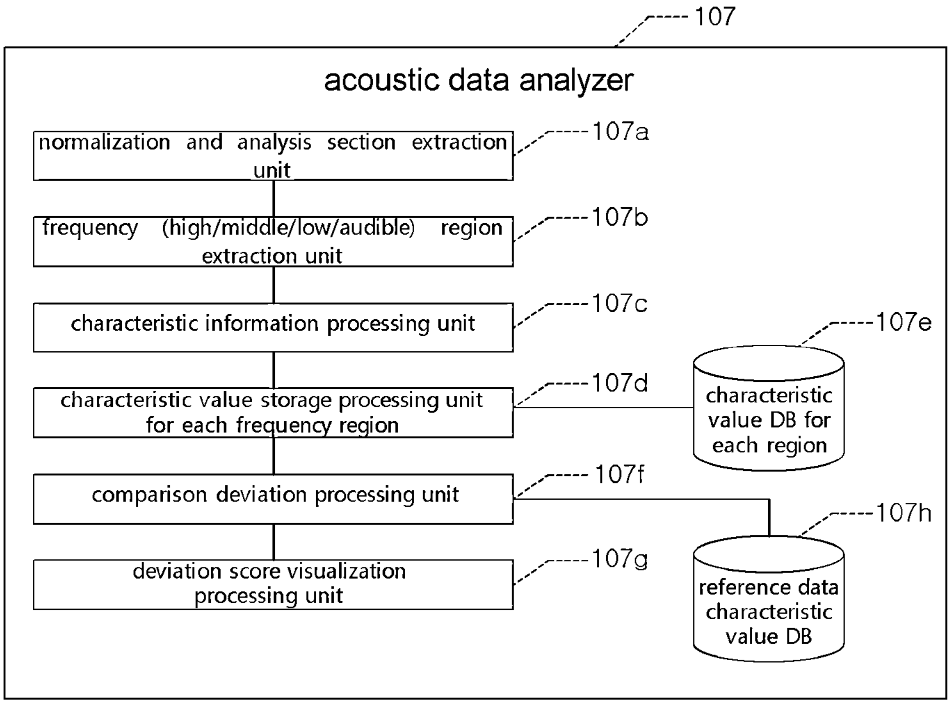
FIG. 3 is a block diagram showing a configuration of an acoustic data analyzer in FIG. 2.

The acoustic data analyzer 107 is a module that analyzes and processes characteristics of time series acoustic data. As shown in FIG. 3, the acoustic data analyzer 107 includes a normalization and analysis section extraction unit 107*a*, a frequency (high/middle/low/audible) region extraction unit 107*b*, a characteristic information processing unit 107*c*, and a frequency characteristic value storage processing unit 107*d* for each region, a characteristic value DB for each region 107*e*, a comparison deviation processing unit 107*f*, a deviation score visualization processing unit 107*g*, and a reference data characteristic value DB 107*h*.

The extraction unit 107*b* for each frequency (high/middle/low/audible) region removes noise from an input acoustic data and extracts a time interval (usually in seconds) required for a normalization processing and analysis.

The characteristic information processing unit 107*c* separates the extracted time interval (e.g., 4 second interval data) into low frequency, midrange, high frequency, entire audible frequency region, etc. by frequency region. Here, each frequency region can be varied in various ways depending on the characteristics of the acoustic data and the information to be found.

The characteristic value storage processing unit 107*d* for each frequency region divides each of the separated frequency regions into a plurality of characteristic elements (for example, about 40 to 70) and stores the characteristic information of the acoustic data for each characteristic in the characteristic value DB 107*e* for each region. In addition, the characteristic value storage processing unit 107*d* for each frequency region scores for each region and stores a total value analyzed in the characteristic value DB 107*e* for each region. In other words, the data separated by the region contains characteristics information of the frequency of a specific region during a specific time period. Here, the characteristic value storage processing unit 107*d* extracts various characteristics (high, low, upward, downward, periodicity, and non-periodicity of the frequency etc.) of the acoustic data in the corresponding region and stores them in the characteristic value DB 107*e* for each region.

The characteristic value DB 107*e* for each region is a database in which characteristic values of acoustic data to be analyzed are stored.

The comparison deviation processing unit 107*f* analyzes a deviation between the characteristic value of a reference data and the characteristic value to be analyzed.

The deviation score visualization processing unit 107*g* scores the analyzed deviations, calculates a score appropriate for each characteristic deviation, and visualizes and displays a corresponding score table (see 1 in FIG. 13) as well as a polygon-shaped graph (see 2 in FIG. 13).

The reference data characteristic value DB 107*h* is a database in which characteristic values of acoustic data of a specific standard car (or car model) are stored.

Figure 8:
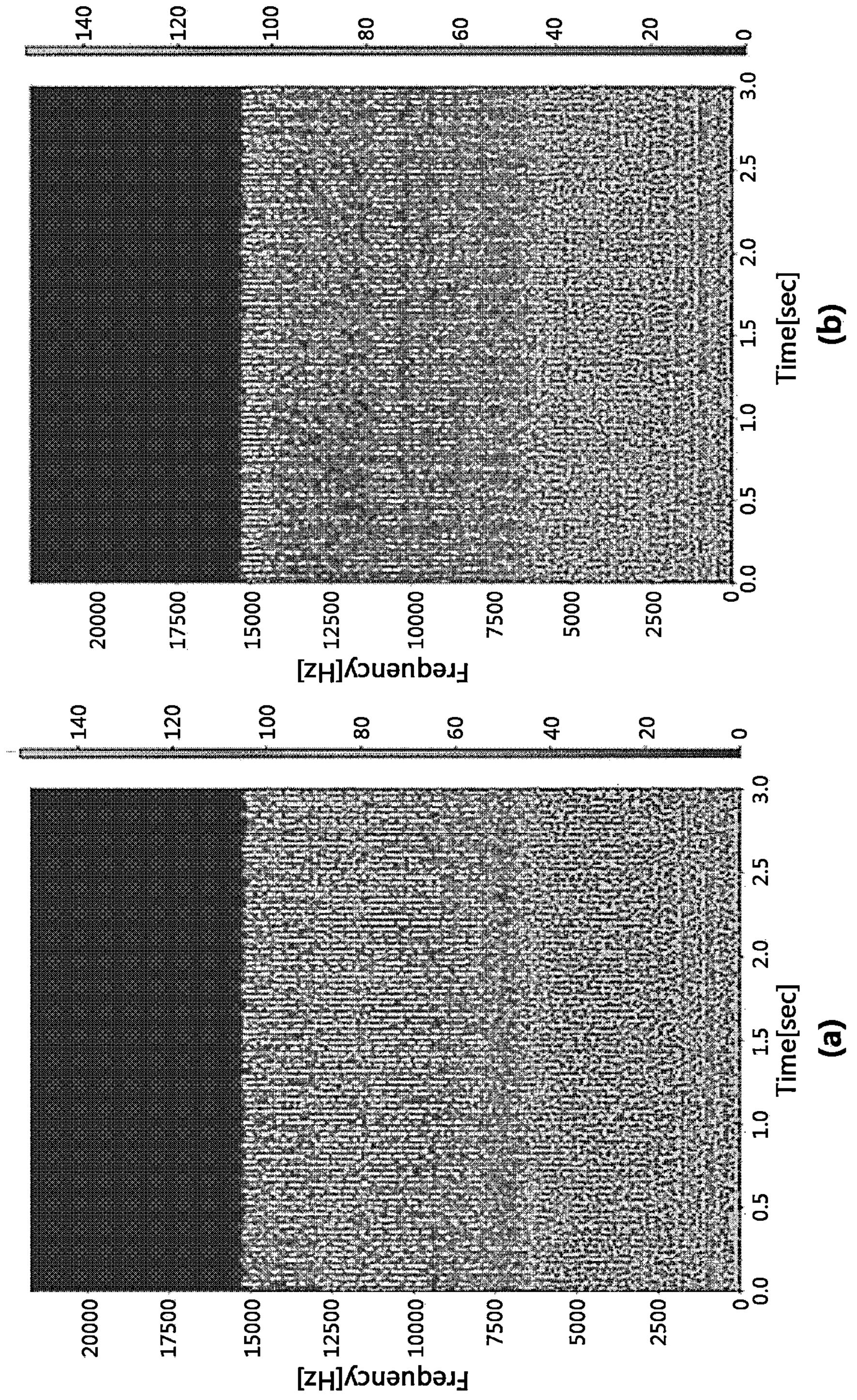
FIG. 8 is a spectrogram comparing a normal state and an abnormal state of a gasoline engine.
Figure 9:
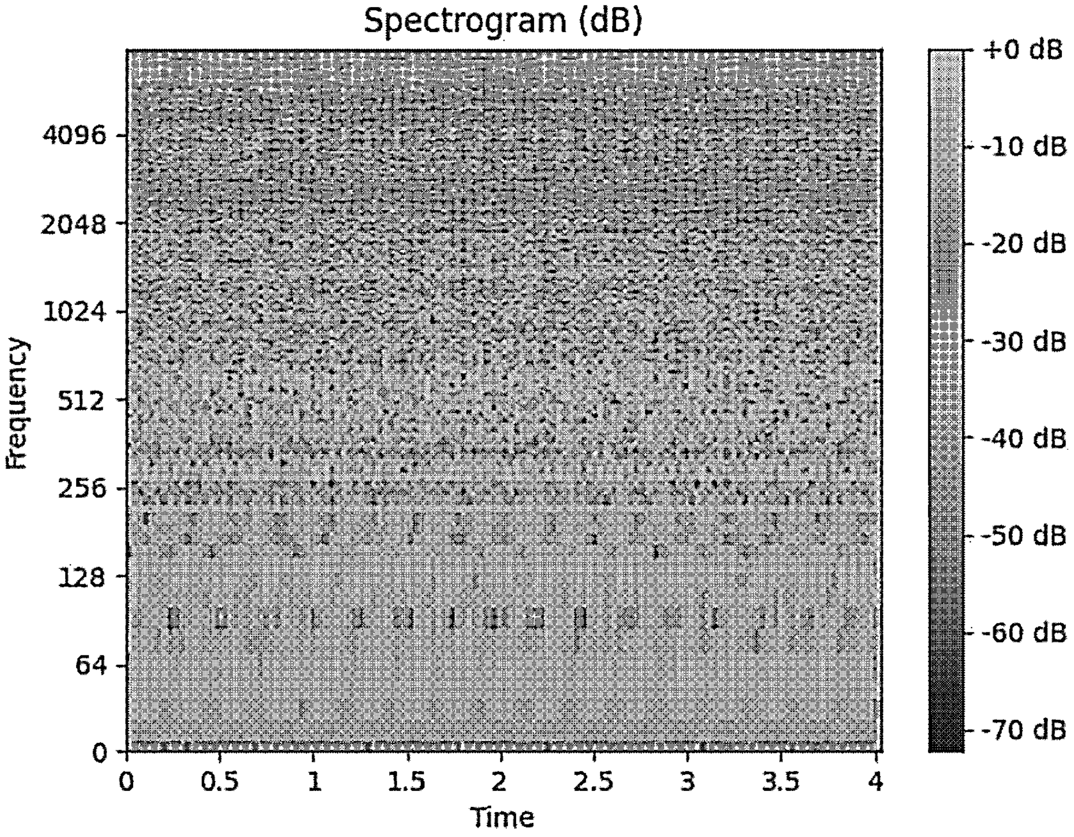
FIGS. 9 to 12 are spectrograms showing examples of AI performance inspection results visualized by the present invention.
Figure 10:
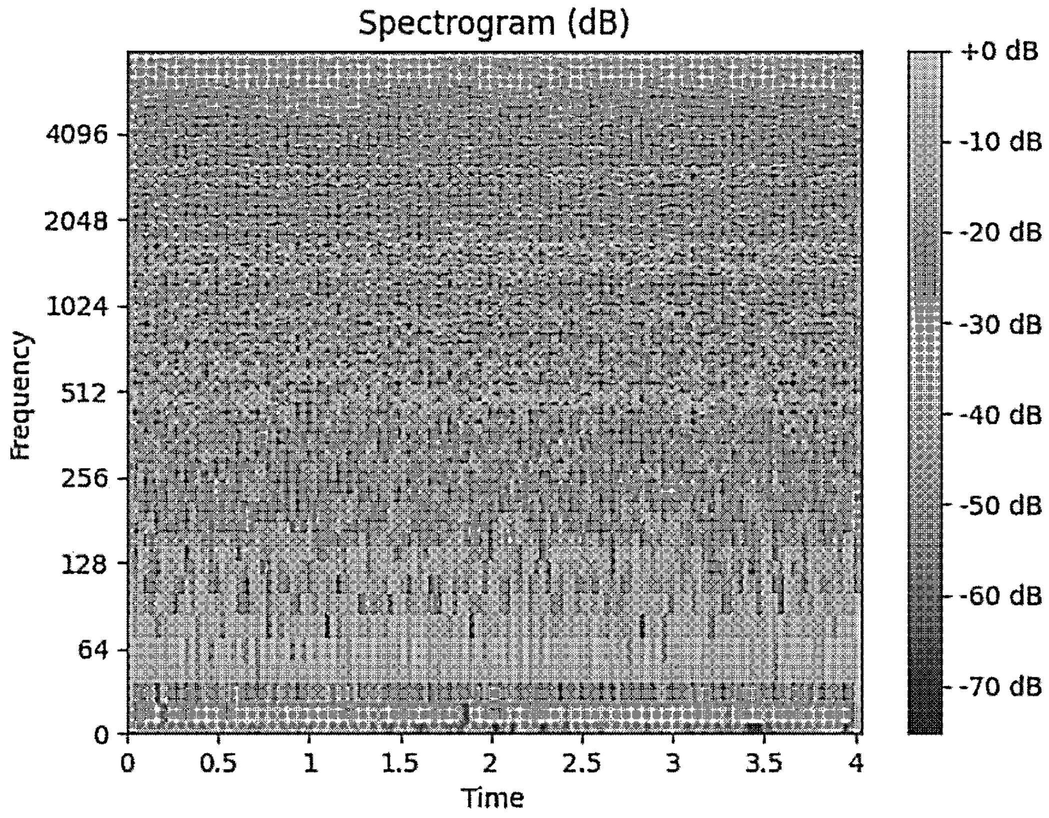
Figure 11:
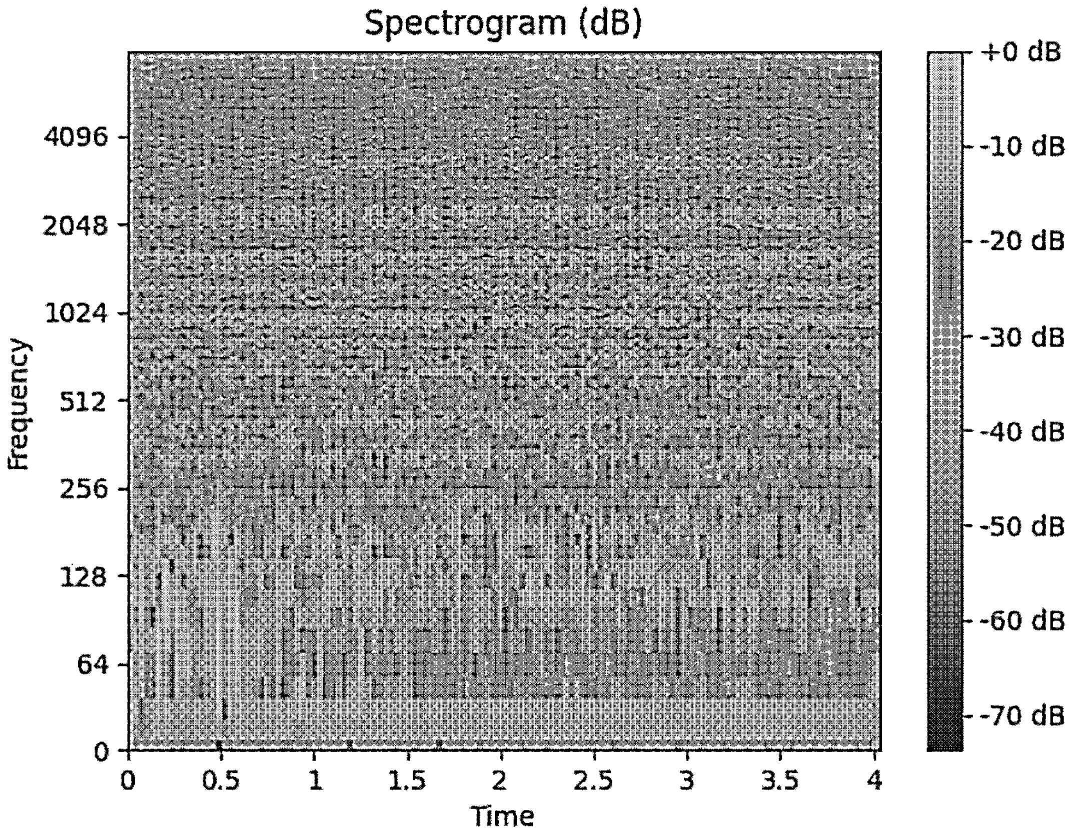
Figure 12:
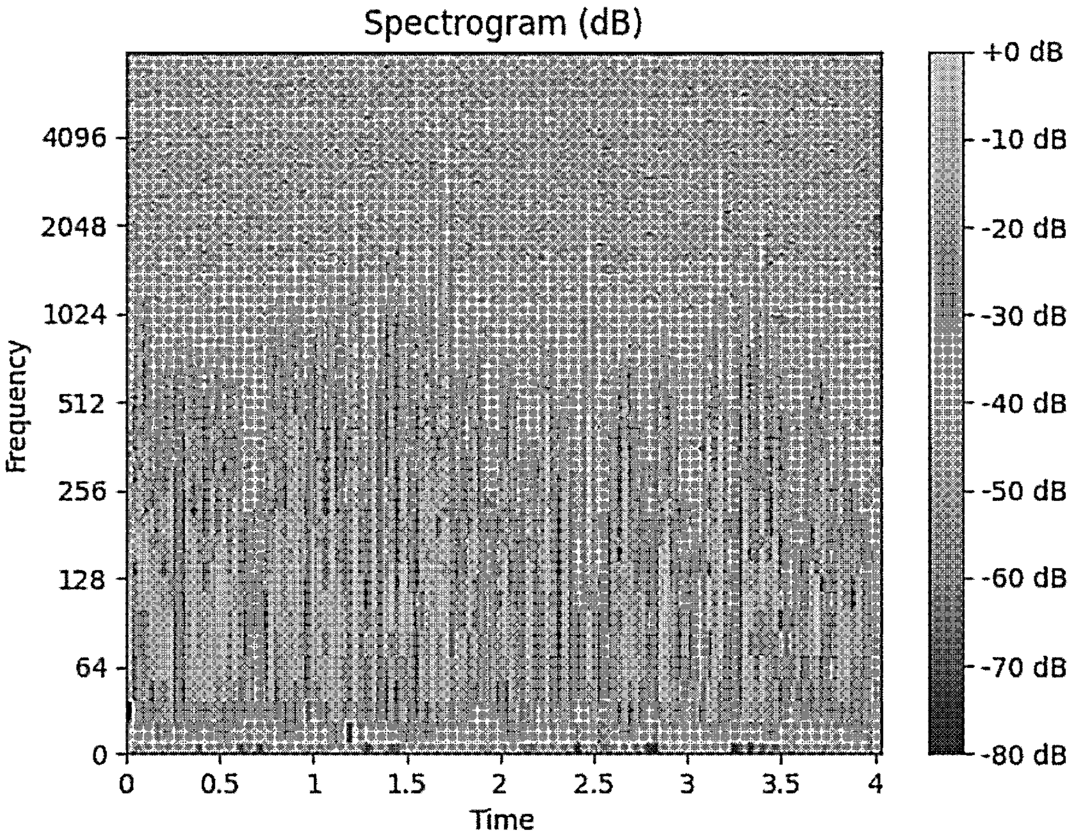

Each part of a car generates sound of a different frequency band. As described above, it is possible to determine whether the part is normal or abnormal by subdividing the frequency band and measuring periodic activity. For example, FIG. 8 shows a spectrogram for a normal state (a) of a gasoline engine and a state (b) in which only three cylinders are operating due to a spark plug failure. Referring to FIG. 8(*b*), it can be seen that an abnormal pattern appears in a frequency band of approximately 10,000 to 13,000 Hz. Therefore, by analyzing the characteristic information of this region, an abnormal state of the relevant engine can be efficiently detected.

The unstructured data visualization processing unit 108 visualizes the AI performance inspection results and generates a car performance inspection graph. The AI performance inspection results may include acoustic wave graphs, images, tables, etc. used in the pattern analysis process of acoustic information as shown in FIGS. 4 to 6. More preferably, the unstructured data visualization processing unit 108, as shown in 4 of FIG. 13, performs visualization processing on the AI performance inspection result data so that the AI performance inspection result is displayed at a customer terminal through a user interface (UI) that compares the normal performance state and the deteriorated performance state with a graph. In this way, by displaying both the graph for the deteriorated performance state and the graph for the normal state, customers can intuitively understand whether performance is degraded or not.

Specifically, the visualization processing unit 102*f* of the performance checklist generation module 102 processes the acoustic source file corresponding to the acoustic signal to generate visualization processed graphics having a 3D image format including a time axis, a frequency axis, and an intensity axis. Preferably, the visualization processed graphics may be a spectrogram that represents changes in amplitude with respect to time (horizontal axis) and frequency (vertical axis) of an acoustic signal in terms of concentration or color difference, as described above.

As shown in FIGS. 9 to 12, the visualization processing unit 108 of the performance checklist generation module 102 displays a spectrogram of the AI performance inspection result obtained through various analyses in the AI performance checklist.

The performance information report processing unit 109 generates an abnormality report when an abnormality is found in the acoustic information, and when there is no abnormality, it generates a normal report and reflects it in the AI performance inspection results. The abnormality report or normal report generated by the performance information report processing unit 109 is stored in the car model information DB 111.

The performance checklist generation module 102 is equipped with an SNS error reporting processing unit 110 to increase database reliability of the car model information DB 111 and enable rapid data updates. When an error for a specific car model is reported through SNS such as Internet news or Twitter, the SNS error reporting processing unit 110 analyzes the error details and, if it is determined that the car model has the error, update the error data by reflecting the car model information DB 111.

Additionally, the performance checklist generation module 102 displays a user interface (see 3 in FIG. 13) on the AI performance checklist so that the customer can directly listen to the corresponding sound. That is to say, the user interface can stream and play acoustic information collected for specific parts of a used car and reference car acoustic information for each car model stored in advance.

The unstructured data transmission unit 208 provides the AI performance inspection results generated by the performance checklist creation module 102 to the customer along with the basic performance inspection results. At this time, the AI performance inspection result includes visualized information generated by the unstructured data visualization processing unit 108.

Preferably, the used car AI performance inspection system 204 provides a resume service for AI performance inspection even after the used car is sold.

FIG. 4 is a flowchart showing a service method performed by a used car AI performance inspection system according to a preferred embodiment of the present invention.

As shown in FIG. 4, the intelligent performance inspection service method according to a preferred embodiment of the present invention is performed by interactions among a car seller 100, an intelligent performance inspection service system 204, an on-site car buyer 101, and an online car buyer 101'.

First, when a used car for sale is registered and received by the car seller 100 (step S104 and step S105), the intelligent performance inspection service system 204, after the car is washed (step S106), performs taking photos an interior/exterior of the car (step S107), collecting an acoustic data (step S108), inspecting a basic performance (step S109), and AI performance inspection (step S110) sequentially to complete the performance inspection (step S111).

Thereafter, when a performance checklist request is received from an on-site car buyer 101 (step S112) or an online car buyer 101' (step S113), the intelligent performance inspection service system 204 issues a basic performance checklist first and provides it to the on-site car buyer (101) or online car buyer (101') (step S114). At this time, the performance checklist document output unit 203 provided in the intelligent performance inspection service system 204 prints and provides the performance checklist 115, 116 on which documents and/or photos related to the basic performance information of the car for sale are disclosed in offline or online.

Additionally, an AI performance checklist 118 is issued and transmitted to the online car buyer 101' (step S117). The AI performance checklist 118 is issued by reflecting unstructured performance inspection data such as sound and video unique to the car being sold as well as structured data in the form of the documents or the photos.

Specifically, the intelligent performance inspection service system 204 performs pre-processing of Fourier transform and noise removal on the acoustic information signal obtained from the car after requesting car model information, and performs pattern analysis through computer learning for periodic or non-periodic and unusual information. In addition, the intelligent performance inspection service system 204 maps the analyzed information with the searched car model information and the error history (user information from its own DB, public API or SNS, etc.) for each car model owned by itself to evaluate and analyze whether the problem is limited to the current car or a problem depending on the characteristics of each car model. The analyzed reporting information is reflected when issuing the AI performance checklist.

The intelligent performance inspection service system 204 visualizes the AI performance inspection results through the performance checklist generation module 102 and generates a car performance inspection graph. The AI performance inspection results reflect the acoustic waveform graphs, images, tables, etc. used in the pattern analysis process of acoustic information. In addition, the performance checklist generation module 102 compares and displays the normal performance state and the deteriorated performance state in a graph according to the AI performance inspection results. And the performance checklist generation module 102 subdivides the acoustic data into the low frequency band, midrange band, high frequency band, regularity region, and irregularity region, and scores the state of each band or region to display the scores on the AI performance checklist.

According to another aspect of the present invention, a recording medium (for example, magnetic recording medium, CD-ROM, flash memory, etc.) recording a program capable of executing following procedures on a computer is provided. The procedures include a procedure for inquiring detailed car model information of a used car; a procedure for collecting unstructured data generated from a mechanical or electronic devices of the car through interior/exterior photography of the used car and sound, video, and sensors; a procedure for AI performance inspection reflecting in the AI performance inspection results by generating an abnormalities report when abnormalities are found and generating a normal report when abnormalities are not found through diagnosing the unstructured data to check the performance using the computer analysis; a procedure for visualizing the AI performance inspection results and generating a spectrogram which is a visualization processed graphics that show the changes in time, frequency, and amplitude of the acoustic signals in the normal and deteriorated performance states of the used car in terms of concentration or color differences and displays them on the AI performance checklist; a procedure for dividing the acoustic signal into frequency bands according to predetermined standards, and scoring the state of each frequency band, and displaying them in detail on the AI performance checklist; and a procedure for providing the AI performance inspection results along with the basic performance inspection results to the customer.

As described above, according to the present invention, there is a significant effect of obtaining detailed AI performance inspection results by dividing the acoustic data into specific frequency bands, analyzing periodic and aperiodic patterns occurring within them, learning them for diagnosis. In addition, by providing even the original collected data to authorized customers, it is possible to resolve an extreme information asymmetry that occurs when information about the car for sale is not accurately conveyed to the buyer, and allow indirect judgment for emotional quality for purchasing the car online to promote the online use of used car transactions.

Although the present invention has been described above with limited examples and drawings, the present invention is not limited thereto, and the technical idea of the present invention and the description below will be understood by those skilled in the art to which the present invention pertains. Of course, various modifications and variations are possible within the scope of equivalence of the patent claims.

What is claimed is:

1. Used car AI performance inspection processing method based on acoustic data analysis, the method comprising steps of;

(a) a performance checklist generation module inquires detailed car model information of the used car;

(b) the performance checklist generation module collects unstructured data including sounds generated from mechanical or electronic devices of the used car using an acoustic sensor;

(c) the performance checklist generation module performs an AI performance inspection by diagnosing the collected unstructured data through a computer analysis and generating an AI performance checklist by reflecting results of the AI performance inspection; and (d) an unstructured data transmission unit provides the AI performance checklist generated by the performance checklist generation module to a customer by displaying the AI performance checklist on a terminal device of the customer, wherein the step (c) includes steps of;

a visualization processing procedure that generates visualization processed graphics from the results of computer analysis of the unstructured data and displays the graphics on the AI performance checklist;

performing a segmentation analysis processing procedure that divides the acoustic data into frequency bands according to predetermined standards, and scores for a state of each frequency band, and displays the scores on the AI performance checklist, wherein, in the step (c), the visualization processed graphics are spectrograms that show changes in time, frequency, and amplitude of the acoustic signal in terms of concentration or color difference, wherein the spectrograms for each of a normal performance state and a deteriorated performance state of the used car are generated and displayed on the AI performance checklist.

2. A method according to claim 1, wherein the segmentation analysis processing procedure of the step (c) subdivides the acoustic data into low-frequency band, mid-range band, high-frequency band, regularity and irregularity regions, scores the state of each band or region, and displays the scores on the AI performance checklist.

3. A method according to claim 2, wherein each region or band is decomposed into a plurality of characteristic elements, analyzed, and scored in the segmentation analysis processing procedure of the step (c).

4. A method according to claim 3, wherein the state of each region or band is visualized as a polygonal graph by the score and the total score on the AI performance checklist in the segmentation analysis processing procedure of the step (c).

5. A method according to claim 1, wherein a user interface with a function of streaming and playing acoustic information collected for specific parts of the used car and pre-stored standard car acoustic information for each car model is displayed on the AI performance checklist in the step (c).

* * * * *